(12) United States Patent
Haider et al.

(10) Patent No.: US 10,032,141 B1
(45) Date of Patent: Jul. 24, 2018

(54) MOBILE DEVICE HOLDING MECHANISM FOR MULTIPLE CHECK DUPLEX IMAGE CAPTURE

(71) Applicant: Wells Fargo Bank, N.A., San Francisco, CA (US)

(72) Inventors: Imran Haider, San Ramon, CA (US); John L. Miller, Jr., San Francisco, CA (US); Andrew J. Garner, IV, State Road, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 574 days.

(21) Appl. No.: 14/707,935

(22) Filed: May 8, 2015

(51) Int. Cl.
| | |
|---|---|
| *G06K 7/00* | (2006.01) |
| *G06Q 20/04* | (2012.01) |
| *G06Q 40/02* | (2012.01) |
| *B65G 47/90* | (2006.01) |
| *G03B 17/56* | (2006.01) |
| *H04N 1/00* | (2006.01) |
| *G02B 5/10* | (2006.01) |

(52) U.S. Cl.
CPC ......... *G06Q 20/042* (2013.01); *B65G 47/901* (2013.01); *G03B 17/561* (2013.01); *G06Q 40/02* (2013.01); *H04N 1/0062* (2013.01); *H04N 1/00228* (2013.01); *H04N 1/00246* (2013.01); *G02B 5/10* (2013.01);

(58) Field of Classification Search
USPC ...................................... 235/486; 705/35, 39
See application file for complete search history.

(56) References Cited

U.S. PATENT DOCUMENTS

| | | | |
|---|---|---|---|
| 8,688,579 B1* | 4/2014 | Ethington | G06Q 40/02 705/35 |
| 8,768,038 B1 | 7/2014 | Sherman et al. | |
| 2011/0134248 A1 | 6/2011 | Heit et al. | |
| 2011/0258113 A1* | 10/2011 | Jones | G06Q 20/042 705/39 |
| 2013/0103582 A1 | 4/2013 | Singfield | |

* cited by examiner

*Primary Examiner* — Daniel Hess
(74) *Attorney, Agent, or Firm* — Foley & Lardner LLP

(57) ABSTRACT

Systems and methods for preparing customer check deposit requests with a mobile device and a reflective surface are described. A check frame is positioned between a customer mobile device with a built-in camera and a mirror such that, when a check is placed in the check frame, the camera can view both sides of the check simultaneously. The camera can take a single picture that includes both sides of the check, process it, and submit it as a check deposit request to the customer's financial institution.

20 Claims, 9 Drawing Sheets

US 10,032,141 B1

MOBILE DEVICE HOLDING MECHANISM FOR MULTIPLE CHECK DUPLEX IMAGE CAPTURE

FIELD

The present disclosure generally relates to banking transactions using mobile devices.

BACKGROUND

With the growing prevalence of smartphones, tablets, and other compact mobile computing devices, many financial institutions have developed mobile banking software applications for their customers. These software applications offer convenient ways for customers to perform banking transactions on their mobile devices. One such banking transaction is a check deposit into a customer's account at a financial institution. Customers are able to use a mobile banking software application to deposit checks by taking pictures of the checks with a camera built into their mobile device. As check deposits require an image of both sides of a given paper check, however, a mobile device's ability to process multiple check deposits without significant user interaction is limited.

SUMMARY

One embodiment relates to a customer check deposit request preparation system. The system includes a check frame configured to position a check between a holder and a mirror wherein a first side of the check faces the holder, and a second side of the check faces the mirror. The system further includes the mirror, disposed at a position and an angle behind the check frame such that a reflection of the second side of the check is projected towards the holder. The system includes the holder, disposed at a position and an angle in front of the check frame and the mirror, such that a first side of a check and a second side of the check are simultaneously viewable from the holder, and wherein the holder is configured to hold a mobile device. The system further includes the aperture, comprising a transparent area in the holder.

Another embodiment relates to a computer-implemented method. The method includes positioning, by a check frame, a check between a holder and a mirror such that a first side of the check and a second side of the check are simultaneously visible to a mobile device with a capture circuit. The method further includes capturing, by the capture circuit, at least one image of the first side and second side of the check. The method includes preparing, by the capture circuit, a customer check deposit request. The method further includes transmitting, by the capture circuit, the customer check deposit request to the financial institution computing system.

An additional embodiment relates to a non-transitory computer readable media having computer-executable instructions embodied therein that, when executed by a mobile device operated by a customer of a financial institution computing system, cause the mobile device to perform operations. The operations include capture at least one image comprising a first side and a second side of a check. The operations further include prepare a customer check deposit request. The operations include transmit the customer check deposit request to the financial institution computing system.

These and other features, together with the organization and manner of operation thereof, will become apparent from the following detailed description when taken in conjunction with the accompanying drawings.

DETAILED DESCRIPTION

Referring to the figures generally, systems and methods for preparing check deposit requests from customer mobile devices are described. By positioning a paper check in front of a mirror to project an image of a first side of a check (e.g., the back side) adjacent to a second side of the check (e.g., the front side, accordingly), a mobile device with a built-in camera disposed in front of the check and the mirror can take a single picture that includes both sides of the check. In some arrangements, a device can be set up such that individual checks can be manually or automatically sequentially positioned as described above, captured as an image, and then set aside. As such, systems and methods according to the present disclosure allow a customer of a financial institution to use a mobile device to quickly and efficiently create check deposit requests for several checks with minimal interaction by the customer.

Figure 1A:
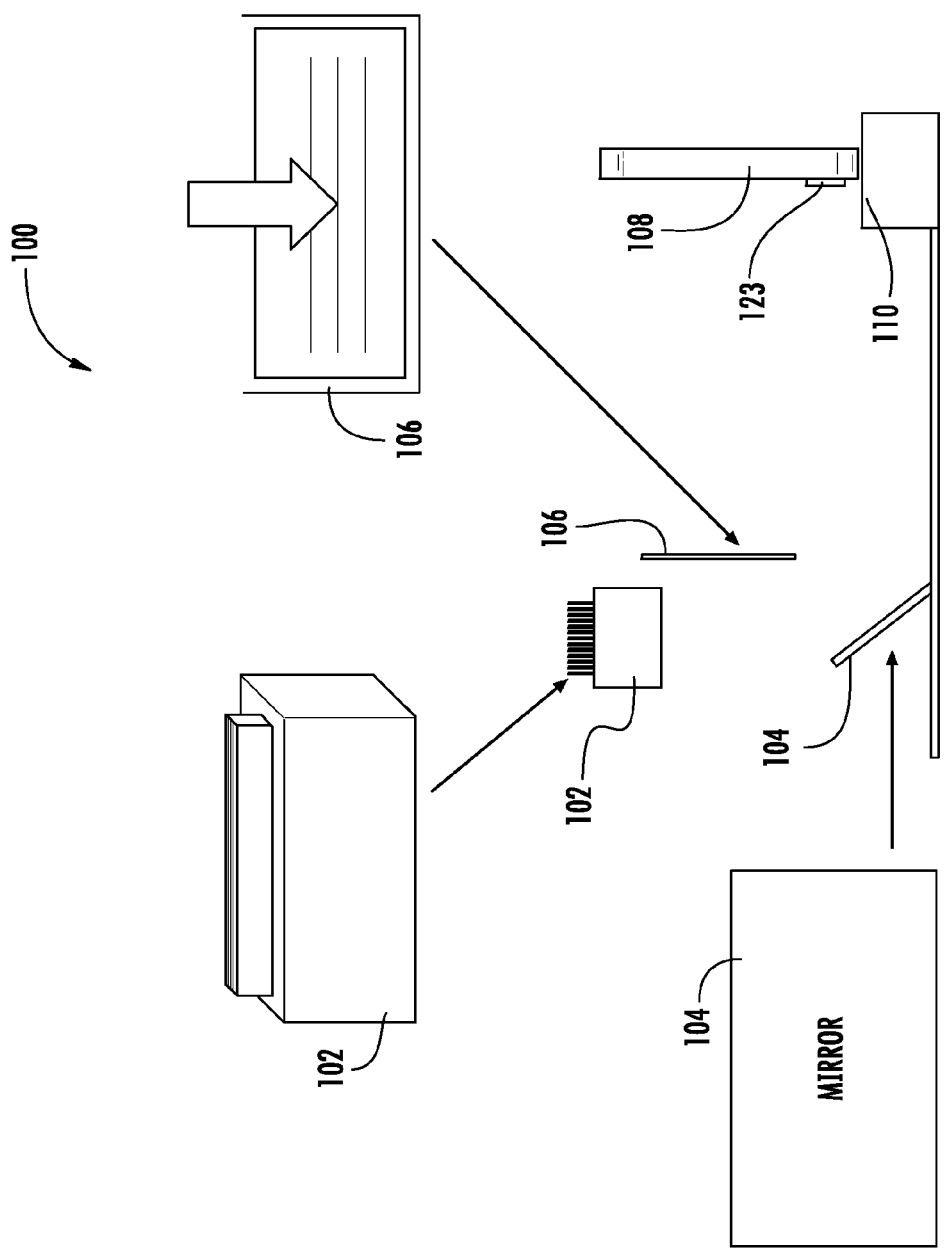
FIG. 1A is a schematic diagram of a computer-implemented customer check deposit preparation and request generating system according to an example embodiment.

Referring to FIG. 1A, a schematic diagram of a computer-implemented check deposit request preparation system 100 is shown according to an example embodiment. System 100 allows customers of a financial institution to use a mobile device 108 to create deposit requests for multiple checks with minimal customer involvement. System 100 is configured to be used by a customer to create check deposit requests to be sent to a financial institution. Customers may be business entities and/or individual persons having one or more accounts with the financial institution. The financial institution is a banking entity capable of maintaining customer financial accounts and processing customer check deposit requests. The financial institution may be a commercial or private bank, a credit union, or an investment brokerage. The relationships among these aspects of system 100 are described in further detail below.

Still referring to FIG. 1A, system 100 includes an input hopper 102, a mirror 104, a check frame 106, a mobile device 108, and a device holder 110. A hopper 102 is a container or a designated area for at least one check. The hopper 102 is configured to cause a plurality of checks within the hopper to be disposed on one side of the hopper. In some arrangements, the hopper 102 includes a spring-loaded pad that pulls or pushes checks to one side of the hopper 102. In other arrangements, the hopper 102 relies on gravity to pull checks to one side of the hopper 102.

Still referring to FIG. 1A, the mirror 104 is a reflective surface capable of projecting a clear, accurate representation of an object facing the mirror 104. The mirror 104 is disposed behind the frame 106, which is a housing or designated area configured to position a check between the mirror 104 and a mobile device 108. The frame 106 is configured such that a first side of a check in the frame 106 is substantially unobstructed to the mirror 104, and the mirror 104 and a second side of a check in the frame 106 is substantially unobstructed to a camera 123 disposed within the mobile device 108.

The mobile device 108 is a portable computing device with a built-in camera 123. The camera 123 is an image-capturing device configured to receive imaging information (e.g., light) through a lens and convert the imaging information into a digital image file. The camera 123 is built into the mobile device 108, which in turn can manipulate various features and functions of the camera 123 (e.g., a focus function, a flash function, initiating an image capture, adjusting light settings, and the like). The mobile device 108 is further capable of accessing various types of data networks, (e.g., wireless networks such as cellular networks, Bluetooth, WiFi, Zigbee, etc., and/or wired networks such as Ethernet, DSL, cable, fiber-based, or a combination thereof). Examples of the mobile device 108 include, for example, smartphones, tablets, PDAs, and the like.

The mobile device 108 further includes a financial institution's mobile software application. The mobile application provides a customer with a user interface that allows the customer to request the financial institution to perform any of several banking-related functions. The customer can interact with the user interface by, for example, interacting with a touchscreen on the mobile device 108, or by interacting with a keyboard and other buttons that are built into the mobile device 108. One banking-related function includes depositing a check into a customer account at the financial institution. The mobile application is configured to allow the mobile device 108 to communicate with a check deposit request preparation device (e.g., check deposit request preparation device 201, as discussed with respect to FIG. 2, below). In some arrangements, the mobile device 108 can communicate with the check deposit request preparation device via a data transfer wire (e.g., a universal service bus cable, an Ethernet cable, or the like). In other arrangements, the mobile device 108 can wirelessly communicate with the check deposit request preparation device (e.g., via Bluetooth™, a wireless network, or the like).

The mobile software application can include a capture circuit, which may include program logic executable by mobile device 108 to implement at least some of the functions described herein. In some arrangements, the capture circuit may allow the mobile device 108 to connect to, communicate with, and enable functions at a financial institution computing system. In order to make the capture circuit, financial institution computing system may provide the mobile software application and make the mobile software application available to be placed on the mobile device 108. For example, the financial institution computing system may make the mobile software application available to be downloaded (e.g., via an online banking website of the financial institution, via an app store, or in another manner). Responsive to a user selection of an appropriate link, the mobile software application may be transmitted to the mobile device 108 and may cause itself to be installed on the mobile device 108. Installation of the software application creates the capture circuit on the mobile device 108. Specifically, after installation, the thus-modified mobile device 108 includes the capture circuit (which may be embodied as a processor and instructions stored in non-transitory memory that are executed by the processor).

The mobile device 108 is held in place by a holder 110, which maintains the position of the mobile device 108 while an image capturing process takes place. The mirror 104, frame 106, and mobile device 108 are positioned such that the camera 123 in the mobile device 108 can take a single image that includes a first side of a check in the frame 106 and a reflection of a second side of the check in the mirror 104.

In some arrangements, the check deposit request preparation device includes a processor (e.g., CPU 127, as discussed with respect to FIG. 2, below) capable of communicating with and/or regulating the function of various aspects of system 100 (e.g., the hopper 102, the frame 106, the mobile device 108, the holder 110, and so on). In one such arrangement, an electrical circuit is disposed throughout the check deposit request preparation device that includes the processor, the hopper 102, the frame 106, and/or the holder 110. As such, the processor may, for example, send and receive signals to and from the hopper 102, the frame 106, the holder 110, and the components thereof. For example, the processor may be able to detect whether any checks are in the hopper 102 via a sensor disposed within the hopper 102, detect whether a check is properly positioned in the frame 106 via a sensor disposed within the frame 106, or cause the frame 106 to remove a check and place a new check from the hopper 102 in position by activating a motor (e.g., the picker motor 130, as discussed below). Further, the processor may be communicatively engaged to the mobile device 108 by a data transfer cable (e.g., a universal service bus cable, an Ethernet cable, or the like) or a wireless data connection (e.g., via Bluetooth™, a wireless network, or the like). Thus, the capture circuit on the mobile device 108 may be able to control the processor, which in turn controls various aspects of the deposit request preparation device. In such an arrangement, the capture circuit can cause the deposit request preparation device to position one or more checks, capture images of the checks, and prepare and transmit a deposit request to a financial institution over a data network.

Figure 1B:
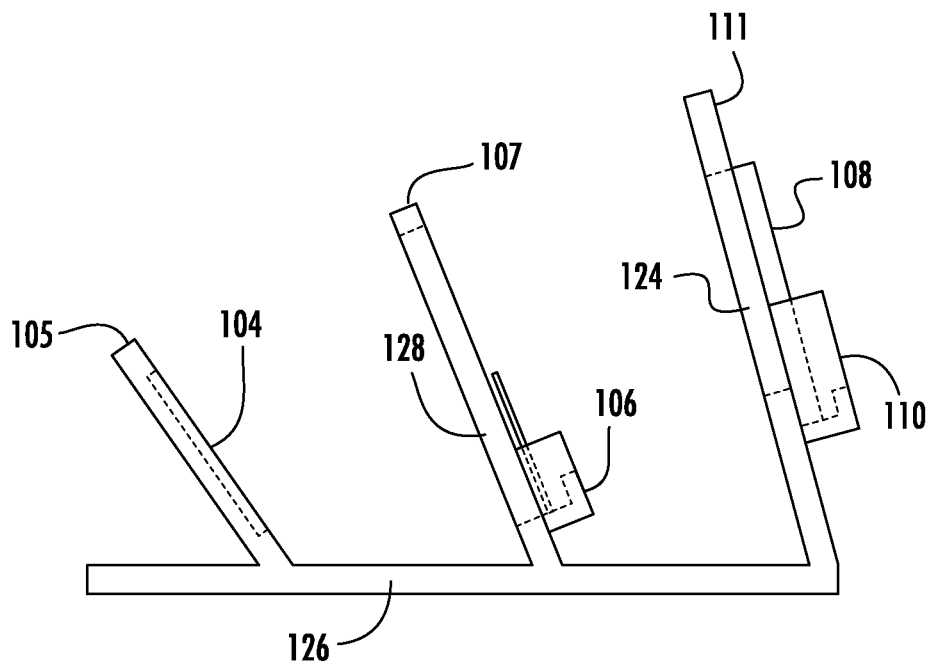
FIG. 1B is an illustrative diagram of a side view of a computer-implemented customer check deposit preparation and request generating system according to an example embodiment.

Referring now to FIG. 1B, an illustrative diagram of a side view of an example embodiment of computer-implemented check deposit request preparation system 100 is shown. This embodiment includes a first arm 105, a second arm 107, and a third arm 111, each of which are joined to a stand 126. The first arm 105 is disposed at one end of the stand 126 and includes a mirror 104 facing the second arm 107. The second arm 107 is disposed at a point on the stand 126 between the first arm 105 and the third arm 111, and includes a clear window 128 (e.g., made up of glass, clear plastic, or the like) and a frame 106. In some arrangements, the window 128 spans the entire area of the second arm 107, such that the entire second arm 107 is itself transparent. In other arrangements, the window 128 spans an area less than the entire area of the second arm 107. The third arm 111 is disposed at the opposite end of the stand 126 relative to the first arm 105, and includes a holder 110, a camera slot 124, and a mobile device 108. The camera slot 124 can be an aperture in the third arm 111. In some arrangements, the camera slot 124 is an open aperture. In other arrangements, the camera slot 124 is a segment of transparent material (e.g., clear plastic or glass). In yet other arrangements, the entire third arm 111 is made up of a transparent material, and as such, no distinct camera slot 124 may be required. As such, in the embodiment shown in FIG. 1B, a first side of a check in the frame 106 and a reflection of the second side of the check from the mirror 104 can be visible to the mobile device 108.

Figure 1C:
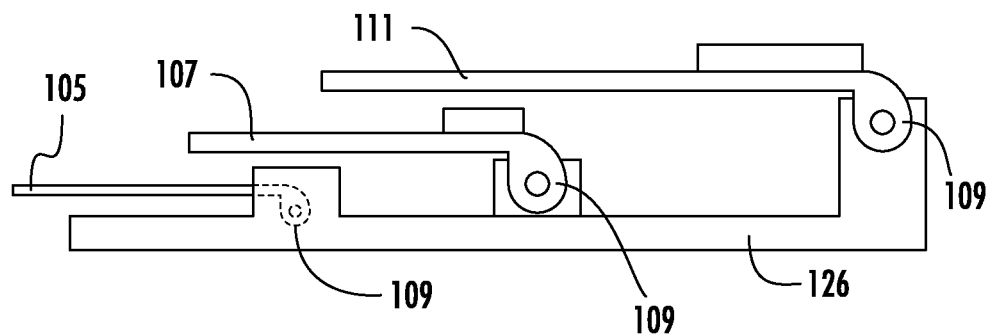
FIG. 1C is an illustrative diagram of a side view of a variation of the computer-implemented customer check deposit request generating system shown in FIG. 1B, according to an example embodiment.

Referring now to FIG. 1C, the first arm 105, second arm 107, and third arm 111 can each be affixed to the stand via a pivot point 109. A pivot point 109 engages at least two objects (e.g., an arm and the stand 126) and allows for the objects to rotate relative to each other. With each arm joined to the stand 126 via a pivot point 109, the angle of each arm can be adjusted to optimize the views available for a mobile device 108 in a holder 110. In addition, the pivot points 109 allow the arms to collapse into a collectively more compact configuration (e.g., as shown in FIG. 1C) when the device is not in use.

Figure 2:
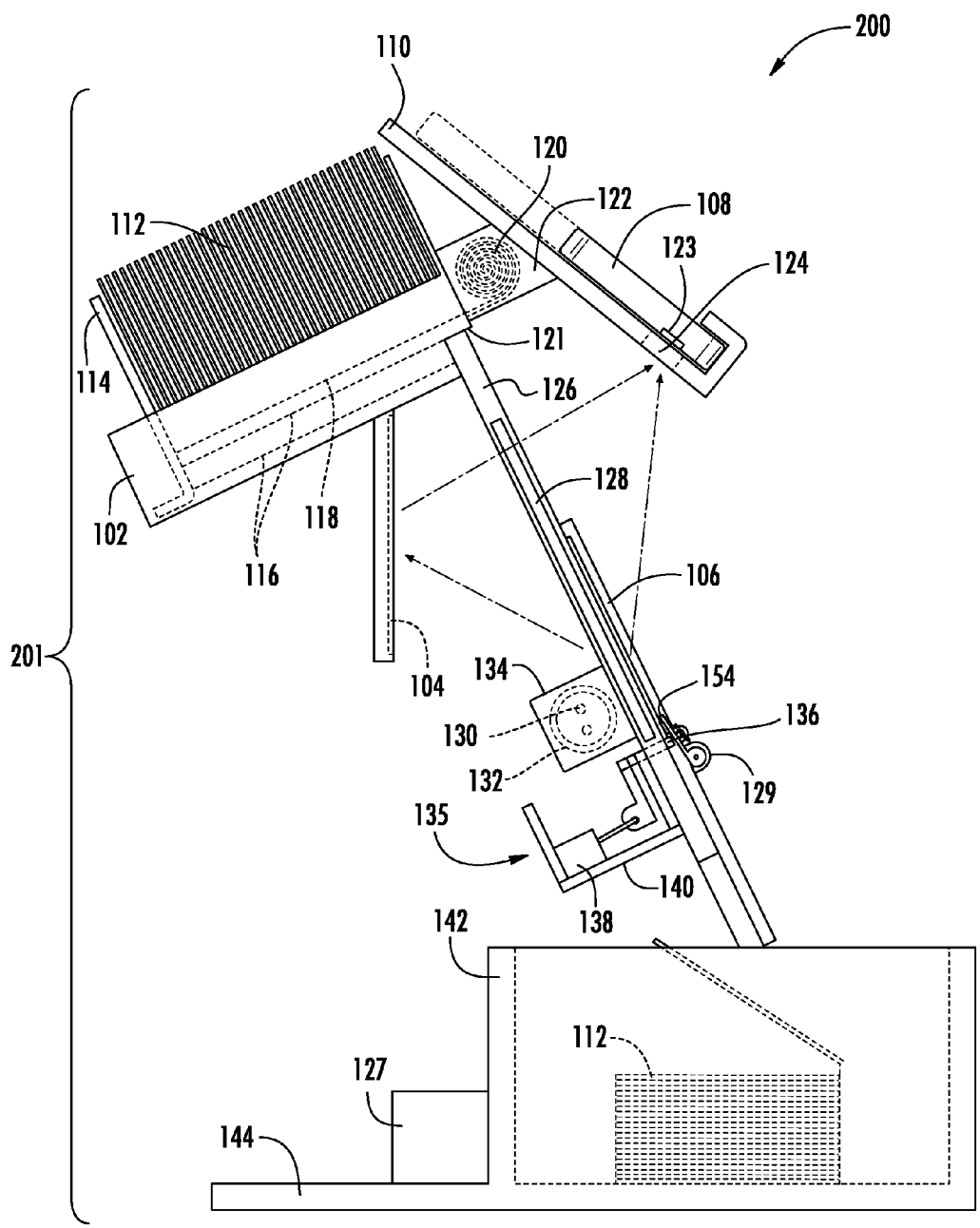
FIG. 2 is an illustrative diagram of a side view of a computer-implemented customer check deposit request generating system according to an example embodiment.

Referring now to FIG. 2, an illustrative diagram of a side view 200 of a check deposit request preparation device 201 is shown according to another example embodiment. For the purposes of discussion, the "front" of the device 201 would be seen if facing the device 201 from the right side of FIG. 2, while the "back" of the device 201 would be seen if facing the device 201 from the left side of FIG. 2. Check deposit request preparation device 201 includes a hopper 102, a holder 110, a mirror 104, and a stand 126. In some arrangements, the stand 126 serves as a foundation and mounting point for various components of the device 201. For example, the hopper 102, the holder 110, the mirror 104 may all be directly or indirectly mounted to the stand 126. Additional components such as the picker mechanism 129 and its various components (e.g., as discussed in more detail below) may also be mounted to the stand 126. Further, in some arrangements, some components may be integrated into the stand itself, such as the frame 106 or the window 128.

The hopper 102 is, in one embodiment, an open container configured to accommodate a plurality of checks 112 and to cause the checks 112 to come in contact with the front wall of the hopper 102 (i.e., the right-most wall as shown in FIG. 2). The hopper 102 includes checks 112, a check feed pad 114, guide slots 116, spring wires 118, coil springs 120, and a feed slot 121. Checks 112 are hard copy instruments entitling named customers of a financial institution to the payment of funds from a payer's account. Checks 112 are uniformly disposed as a stack of paper documents in the hopper 102 such that the last check is in contact with the check feed pad 114 and the first check is in contact with the front wall (i.e., farthest to the right) of the hopper 102.

The check feed pad 114 is a spring-loaded panel or pad disposed at the back (i.e., farthest to the left) of the hopper relative to the stack of checks 112 in the hopper 102. The check feed pad 114 is in contact with the back of the last check in the stack of checks 112, and is configured to cause the stack of checks 112 to come in contact with the front wall of the hopper 102. The translation of the check feed pad 114 along the length (i.e., from back to front or front to back) of the hopper 102 is restricted by the guide slots 116, which are indented channels in both side walls and run the length (i.e., from back to front) of the hopper 102. In some arrangements, a peg at both sides of the check feed pad 114 extends into the guide slots 116, and as such, the check feed pad 114 can travel along the length of guide slots 116 in the hopper 102 (i.e., from back to front and front to back), but cannot travel up and down the walls of the hopper 102. Spring wires 118 disposed along the length of both sides (i.e., running along both side walls from back to front) of the hopper 102 are engaged to opposite sides of the check feed pad 114 at one end of each of the spring wires 118, and to coil springs 120 at the other end. Coil springs 120 are elastic extensions of metal wire that, in the absence of an external force applied to them, are in a retracted and coiled configuration. As such, if an external force is applied to stretch the coil springs 120, the coil springs 120 will exert a corresponding, opposing force and seek to return to the retracted and coiled configuration. The spring wires 118 are configured to transfer the force exerted by the coil springs 120 to the check feed pad 114 to cause the check feed pad 114 to apply pressure to the back side of the stack of checks 112 in the hopper 102. As such, the check feed pad 114, spring wires 118, and the coil springs 120 work together to cause the checks 112 to be pulled to the front of the hopper 102 (i.e., the right most wall in FIG. 2). A check feed slot 121, which is an aperture running the width of the hopper (i.e., in parallel with the stack of checks) at the front bottom corner of the hopper allows single checks to be drawn out from the front bottom of the hopper 102.

Still referring to FIG. 2, the holder 110 includes a pivot mount 122 and a camera slot 124. The holder 110 is a housing configured to accommodate the various possible shapes and sizes of a mobile device 108. In the example embodiment shown in FIG. 2, the holder 110 is a flat panel with a perpendicular shelf-like protrusion at the bottom end (i.e., the right most end) of the holder 110. The protrusion serves to hold a mobile device 108 in place (i.e., to prevent the mobile device 108 from sliding off the holder 110). In some arrangements, the holder 110 can include a sensor configured to communicate with a CPU (e.g., CPU 127, as discussed in more detail below). As such, signals relating to the mobile device 108 in the holder 110 can be exchanged (e.g., a signal indicating that the mobile device 108 located in the holder 110, a signal that the mobile device 108 is properly positioned in the holder 110, and the like).

The camera slot 124 can be an aperture in the holder 110. In one embodiment, the camera slot 124 is disposed within the holder 110 toward the bottom end of the holder 110 such that the mirror 104 and frame 106 can be seen through the camera slot 124. In some arrangements, the camera slot 124 is an open aperture. In other arrangements, the camera slot 124 is a segment of transparent material (e.g., clear plastic or glass). In yet other arrangements, the entire holder 110 is made up of a transparent material, and as such, no distinct camera slot 124 may be required. In this example embodiment, the holder 110 is engaged to a stand 126 by a pivot mount 122. The pivot mount 122 is an articulating joint that allows the holder 110 to rotate about the pivot mount 122 relative to the stand 126. As such, the angle of the holder 110 can be adjusted such that the built-in camera 123 on a mobile device 108 disposed on the holder 110 can view the mirror 104 and the frame 106 through the camera slot 124 simultaneously.

Still referring to FIG. 2, a mirror 104 extends from the bottom of the hopper 102 and faces the camera slot 124 of the holder 110 and the back side of the frame 106. The frame 106 is a designated area of the stand 126 where a check is to come to rest during the image capturing process. A clear window 128 (e.g., made up of glass, clear plastic, or the like) is disposed across the area of the frame 106 within the stand 126 from the bottom of the frame 106 up to the bottom of the hopper 102, and spans nearly the full width of the stand 126. As such, the full contents of the back side of the contents of the frame 106 (e.g., a side of a check) is visible to the mirror 104 through the bottom end of the window 128, and in turn, the mirror 104 can reflect a corresponding image through the top end of the window and into the camera 123, as shown.

Still referring to FIG. 2, the stand 126 includes a central processing unit ("CPU") 127, a picker mechanism 129, a frame 106, a check stop mechanism 135, an exit hopper 142, and a base 144. The stand 126 is a rigid housing that provides a structural foundation to which the various components of check deposit request preparation device 201 can be mounted. CPU 127 is a software-enabled computing device configured to interpret inputs from the various aspects of check deposit preparation device 201 (e.g., picker mechanism 129 and check stop mechanism 135), and transmit outputs to the various aspects of check deposit preparation device 201. CPU 127 is in wired or wireless communication (e.g., via an electrical circuit, via Bluetooth™, or the like) with the picker mechanism 129 and the check stop mechanism 135, and can therefore coordinate the timing and/or speed of their respective actions. CPU 127 is thus able to cause the various functions described with respect to check deposit preparation device 201 to occur.

CPU 127 is further in wired or wireless communication with mobile device 108, and can therefore transmit and receive information and commands to and from the mobile device 108. In some arrangements, the capture circuit can be configured to cause the mobile device 108 to signal the CPU 127 to start and stop various operations performed by check deposit preparation device 201. For example, a user can interact with the mobile device 108 to confirm that the camera 123 is properly positioned in the camera slot 124 such that the frame 106 and mirror are unobstructed and visible, and then the capture circuit can cause the mobile device 108 to signal the CPU 127 to start the image capturing process. In some arrangements, the mobile device 108 can notify the CPU 127 that the mobile device 108 has successfully captured an image of a check, thereby causing CPU 127 to execute operations to discard the captured check and to line up a new check. Further, in some arrangements, CPU 127 can transmit a signal to the mobile device 108 indicating that there are no more checks in the hopper 102, thereby indicating that the image capturing process can cease.

The involvement of the CPU 127 and the mobile device 108 in the image capturing process can vary. In some arrangements, the sequence, speed, and timing of the functions of the check deposit preparation device 201 is primarily determined by the capture circuit in the mobile device 108, which issues commands to the CPU 127 during the image capturing process. In other arrangements, the sequence, speed, and timing of the various aspects of check deposit preparation device 201 is primarily determined by the CPU 127, and the capture circuit merely starts and stops the overall image capturing process. Various combinations and allocations of these determinations are possible.

The picker mechanism 129 is a device configured to draw a single check from the checks 112 in the hopper 102, pull the check down into the frame 106, and then pull the check from the frame 106 and into the exit hopper 142. The picker mechanism includes a picker motor 130, a picker gear 132, and a picker housing 134, along with additional elements as discussed with respect to FIG. 3, below. The picker motor 130 is an electric machine that converts electrical energy into mechanical energy. Specifically here, the picker motor 130 is configured to convert electrical energy into a rotary force that is applied through a circular picker gear 132. In some arrangements, the picker motor 130 is configured to be powered by a direct current, while in other arrangements, the picker motor 130 is configured to be powered by an alternating current. The picker motor 130 can be activated and deactivated by the CPU 127, and may be configured to provide a forward and a corresponding reverse rotation. Picker gear 132 is a wheel that is engaged to the mechanical output of the picker motor 130, such that the picker motor 130 can cause the picker gear 132 to rotate. In some arrangements, the picker gear 132 is a gear wheel complete with teeth or grooves symmetrically disposed about the outer circumference of the wheel. In other arrangements, the picker gear 132 is a wheel with a smooth, high-friction material (e.g., rubber) disposed about the outer circumference of the wheel. The picker housing 134 is an enclosure attached to the side or back of the stand 126, and contains the picker motor 130 and the picker gear 132.

The check stop mechanism 135 is a device configured to position a check in the frame 106, and to allow a check in the frame 106 to be set aside. The check stop mechanism 135 includes check stop tabs 136, a check stop solenoid 138, and a check stop housing 140. Check stop tabs 136 are retractable prongs that extend and retract on a perpendicular plane relative to the surface of that portion of the stand 126 that includes the frame 106. The check stop tabs 136 are disposed in holes in the stand 126 at the bottom of the frame 106. The check stop tabs 136 can sufficiently extend past the stand 126 to catch a paper check traveling down the stand 126 and into the frame 106, and can fully retract back through the stand 126 such that the check stop tabs 136 do not protrude through the stand 126 at all. In some arrangements, the check stop tabs 136 include a sensor (e.g., based on pressure, light, laser, and the like) that can detect whether a check is resting on the check stop tabs 136. The check stop solenoid 138 is an electric machine that converts electrical energy into mechanical energy. Specifically here, the check stop solenoid 138 is configured to convert electrical energy into a lateral force, which can be applied to the check stop tabs 136. The check stop solenoid 138 can also be activated and deactivated by the CPU 127. As such, the check stop solenoid 138 can cause the check stop tabs 136 to extend and retract on command from the CPU. The check stop solenoid 138 is contained in the check stop housing 140, which is an enclosure attached to the stand 126.

The exit hopper 142 is an enclosure with an open top disposed toward the front of the base 144 of the stand 126. The exit hopper 142 is of a sufficient length and width to accommodate a range of check sizes, and is of a sufficient height to accommodate a certain quantity of checks (e.g., the full stack of checks 112 in the hopper 102). The base 144 is a flat portion of the bottom of the stand 126, and is of a sufficient size and weight such that the rest of the stand 126 is vertically stable during operation.

Figure 3A:
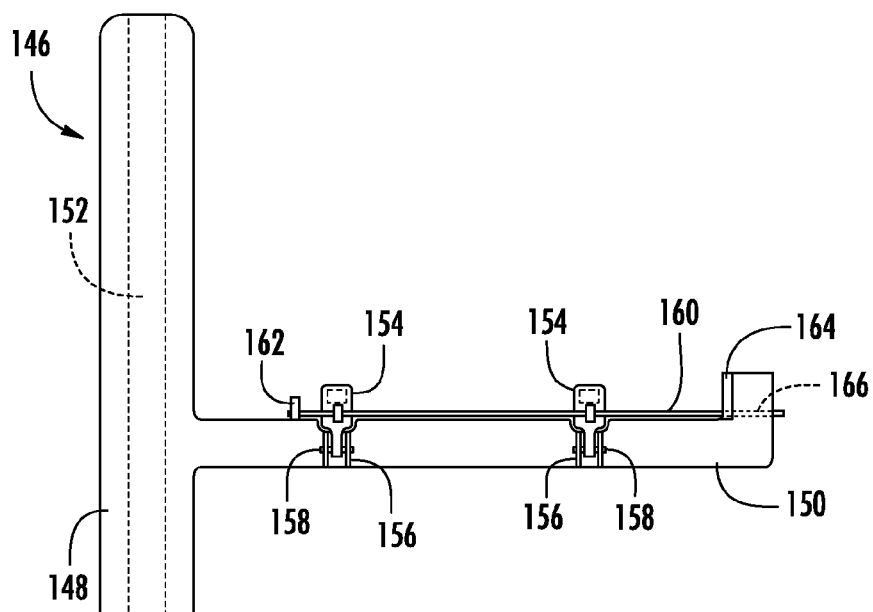
FIG. 3A is an illustrative diagram of the picker arm aspect of the picker mechanism according to an example embodiment.

Referring now to FIG. 3A, a picker arm 146 is shown according to an example embodiment. The picker arm 146 is an additional element of the picker mechanism 129 (as discussed with respect to FIG. 2) that is configured to travel up and down the front side of the stand 126, causing the individual checks to be pulled from the hopper 102, down the stand 126, to the check stop tabs 136, and ultimately into the exit hopper 142. The picker arm 146 includes a vertical first length 148 and a horizontal second length 150 extending from one side of the first length 148. The first length 148 includes an exposed gear track 152 facing the picker gear 132 disposed in the stand 126. The gear track 152 is a length of teeth, grooves, or material corresponding to the teeth, grooves, or material of the picker gear 132 (as discussed with respect to FIG. 2). The gear track 152 (and therefore the first length 148) is of a sufficient length to allow the picker arm 146 to travel from the hopper 102 at the top of the stand 126 to below the check stop tabs 136 towards the bottom of the stand 126.

The second length 150 includes picker fingers 154, pivot mounts 156, pivot pins 158, a guide shaft 160, a first guide shaft support 162, a second guide shaft support 164, and a guide pin 166. Picker fingers 154 are short prongs that can rotate about pivot mounts 156 disposed on the back side of second length 150. In one arrangement, the length of the picker fingers 154 is such that the picker fingers 154 will not obstruct any meaningful portions of a "picked" check during the image capturing process, which will be discussed with respect to FIGS. 5A through 5C, below. In another arrangement, the picker fingers 154 can be of a larger size when accompanied by a bypass assembly (e.g., bypass assembly 186, as discussed with respect to FIG. 4B, below). Pivot pins 158 are laterally disposed through the bottom end of each of the picker fingers 154 (i.e., through each picker finger from left to right). The pivot pins 158 are also laterally disposed through stationary pivot mounts 156 embedded in the second length 150 of the picker arm 146. As such, the picker fingers 154 can pivot back and forth (i.e., into and out of the page) about the pivot mounts 156 through the pivot pins 158.

A guide shaft 160 is a long, rigid cylindrical extension that is disposed through a first guide shaft support 162, through the back sides of the picker fingers 154, through a second guide shaft support 164, and terminates at portion of the guide shaft 160 comprising a guide pin 166. The first guide shaft support 162 is a stationary mount for the guide shaft 160 that is disposed on the second length 150 proximally to the first length 148, relative to the second guide shaft support 164. The second guide shaft support 164 is a stationary mount for the guide shaft 160 that is disposed on the second length 150 distally to the first length 148, relative to the first guide shaft support 162. The first guide shaft support 162 and the second guide shaft support 164 allows for the guide shaft's 160 range of motion, which is dictated by the guide pin 166 disposed at the distal tip of the guide shaft 160 (as will be discussed with respect to FIG. 4, below). As such, the guide shaft 160 and the picker fingers 154 move in unison with the guide pin 166.

Figure 3B:
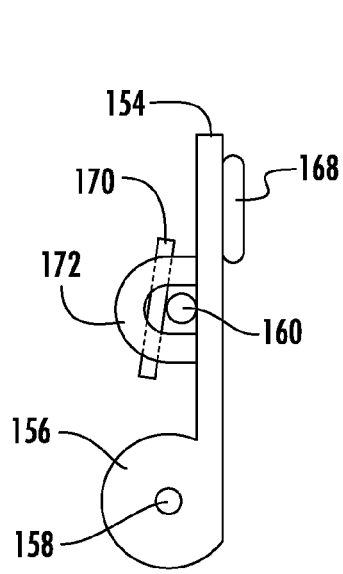
FIG. 3B is an illustrative diagram of a side view of the picker finger aspect of the picker mechanism according to an example embodiment.

Referring now to FIG. 3B, a side view of one of the picker fingers 154 is shown according to an example embodiment. The picker fingers 154 include a pad 168, a flat spring 170, and a support loop 172. The pad 168 is disposed at the back side (i.e., facing into the stand 126) of the top of each of the picker fingers 154. Each pad 168 is made up of a high friction material (e.g., rubber) capable of supporting the weight of a paper check between the pad 168 and a surface (e.g., the stand 126 or the window 128) upon a reasonable application of force by the picker fingers 154.

A flat spring 170 is a small panel of elastic metal that is naturally (i.e., a net application of zero or close to zero force) in a flat configuration, and seeks to return to a flat configuration upon the net application of force in a given direction. The flat spring 170 is disposed across the support loop 172 on the front (i.e., facing away from the stand 126) of each of the picker fingers 154. The support loop 172 is a stationary loop mount on each of the picker fingers 154 through which the guide shaft 160 is disposed. The "loop" portion of the support loop 172 is of a sufficient length such that each of the picker fingers 154 can pivot a small amount while the guide shaft 160 remains stationary. The guide shaft 160 is disposed within the support loop 172 such that it is sandwiched between the front side of each of the picker fingers 154 and a flat spring 170. The flat spring 170 provides an amount of force to the guide shaft 160 to resist but allow the picker fingers 154 a limited range of movement, relative to the position of the guide shaft 160.

Figure 3C:
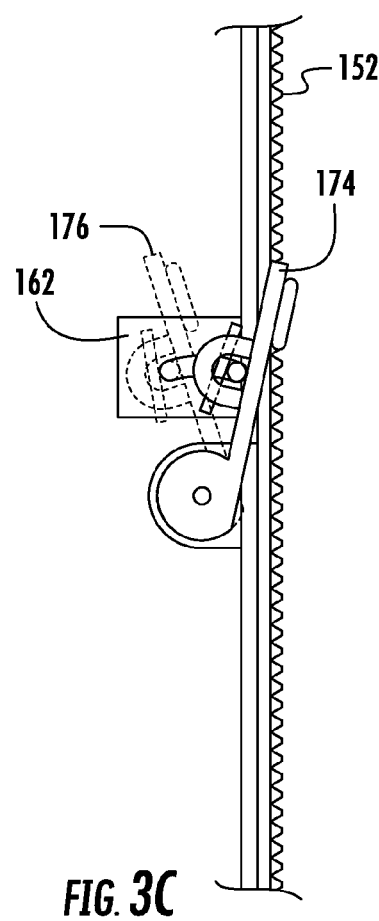
FIG. 3C is an illustrative diagram of a side view of the picker arm aspect of the picker mechanism, showing two possible configurations of associated picker fingers according to an example embodiment.

Referring now to FIG. 3C, a side view of the picker arm 146 is shown according to an example embodiment. Both the first guide shaft support 162 and the second guide shaft support 164 include a curved aperture through which the guide shaft 160 is disposed as shown. As such, the first guide shaft support 162 and the second guide shaft support 164 allow the picker fingers 154 a limited range of rotation about the pivot pins 158. In one configuration, the picker fingers 154 are in an engaged position 174, where the guide shaft 160 has pushed the picker fingers 154 forward towards the stand 126. In another configuration, the guide shaft 160 has pulled the picker fingers 154 away from the stand 126 in a retracted position 176.

Figures 4A, 4B:
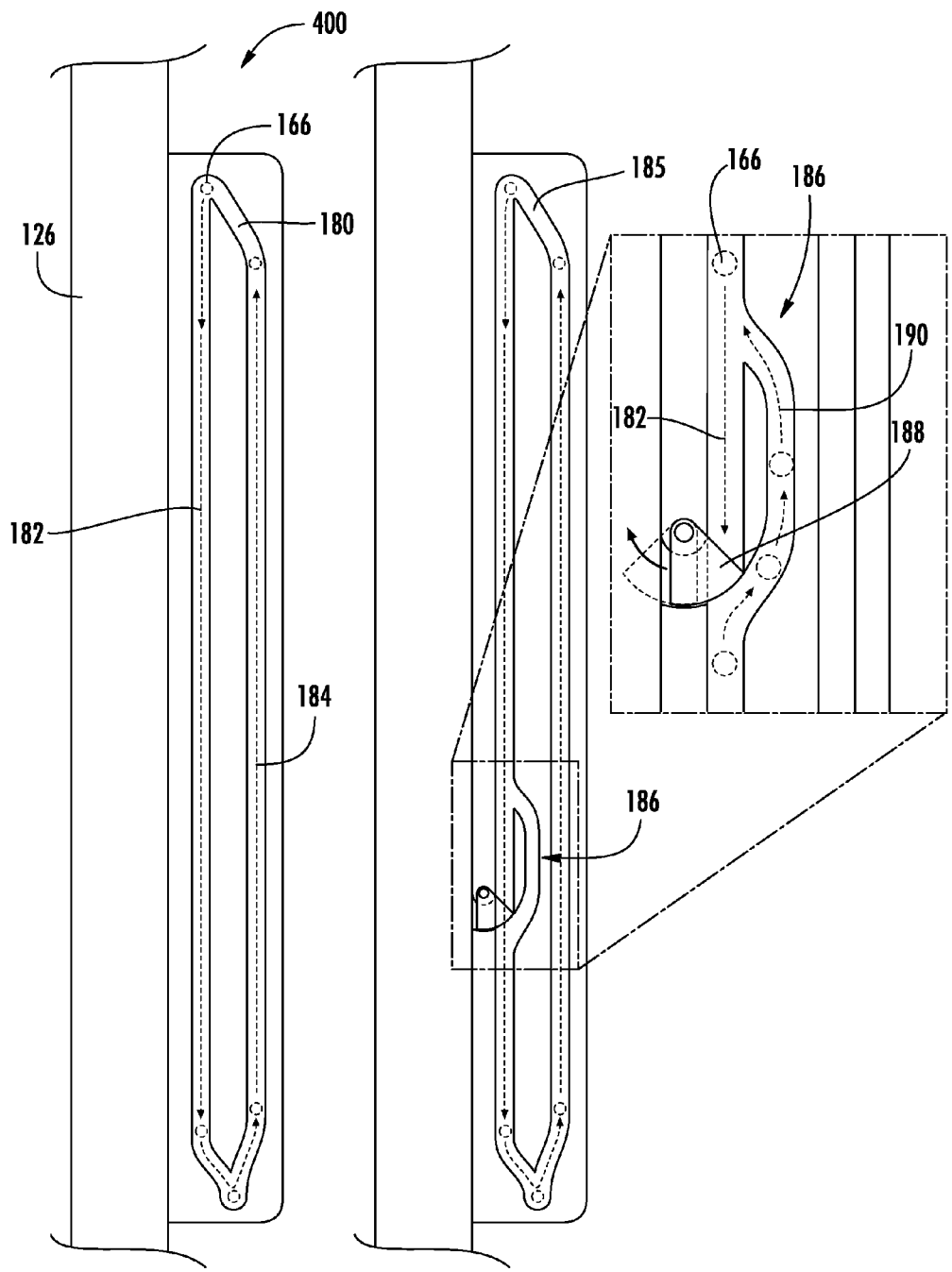
FIG. 4A is an illustrative diagram of a side view of a guide track according to an example embodiment.
FIG. 4B is an illustrative diagram of a side view of an alternative guide track according to an example embodiment.

Referring now to FIG. 4A, a side view 400 of a portion of the stand 126 that includes a guide track 180 is shown according to an example embodiment. The guide track 180 is a long panel running in parallel with a length of the stand 126 (i.e., a segment in the top to bottom direction) on one side of the stand 126 (e.g., the left side or the right side on either side of the window 128, when viewing the stand 126 from the front, as discussed with respect to FIG. 5A below). The guide track 180 includes an indented, grooved circuit on the side of the guide track 180 facing into the middle of the stand 126, which has an engaged track segment 182 and a retracted track segment 184. The tip of a guide pin 166 is disposed within the grooved circuit of the guide track 180. When the guide pin 166 is located in the engaged track segment 182, the guide pin 166 and the associated guide shaft 160 and picker fingers 154 are disposed more proximally to the stand 126, and are thus in the engaged position 174 as discussed with respect to FIG. 3C. When the guide pin 166 is located in the retracted track segment 184, the guide pin 166 and the associated guide shaft 160 and picker fingers 154 are disposed more distally to the stand 126, and are thus in the retracted position 176 as discussed with respect to FIG. 3C.

The grooves in the guide track 180 as shown in FIG. 4A are configured such that a guide pin 166 disposed within the guide track 180 can only travel the grooved circuit in one direction. As such, as a guide pin 166 traveling through the guide track 180 approaches the end of a segment (e.g., engaged track segment 182), the guide pin 166 will continue on into the other segment (e.g., the retracted track segment 184, accordingly) instead of traveling back through the same segment. However, other arrangements allowing for multiple directions of travel are possible (e.g., as discussed with respect to FIG. 4B, below).

Referring now to FIG. 4B, a side view of an alternative guide track 185 (i.e., an alternative to the guide track 180 as shown in FIG. 4A) that further includes a bypass assembly 186 is shown according to an example embodiment. The bypass assembly 186 includes a bypass track segment 190 and a spring pivot 188. Bypass track segment 190 is an extra loop of the alternative guide track 185 that branches inward (i.e., towards the inside of the overall loop created by the alternative guide track 185) off of the engaged track segment 182. Bypass track segment 190 can be disposed in the alternative guide track 185 in a position that is in approximately horizontal alignment with a set of check stop tabs (e.g., check stop tabs 136) at the bottom of a frame (e.g., frame 106), which can be arranged as discussed with respect to FIG. 2. Spring pivot 188 can be a downstream-facing (i.e., relative to the travel of the guide pin 166 down engaged track segment 182), fan-shaped, spring-loaded panel that rotates about an upstream pivot. The resting position of spring pivot 188 within alternative guide track 185 can be such that a downward sloping (i.e., from left to right in FIG. 4B) upstream side and an upward curving (i.e., from left to right in FIG. 4B) downstream side of spring pivot 188 protrudes into and obstructs the engaged track segment 182. The upward curving downstream side of spring pivot 188 protruding into engaged track segment 182 can terminate at a downstream opening of bypass track segment 190. In some arrangements, spring pivot 188 is configured to transmit a signal to CPU 127 if an external force causes spring pivot 188 to rotate.

In operation, the guide pin 166 associated with a picker arm (e.g., picker arm 146) with picker fingers (e.g., picker fingers 154) engaged to a check can travel downstream through the engaged track segment 182 toward the bypass assembly 186. Upon reaching the bypass assembly 186, the guide pin 166 applies a force to the upstream side of spring pivot 188, causing spring pivot 188 to rotate out of engaged track segment 182 and allowing guide pin 166 to pass. Once the guide pin 166 clears the spring pivot 188, the spring pivot 188 can rotate back into its resting position (i.e., due to the spring load associated with the pivot). At or around this stage, the bottom of the check contacts a set of check stop tabs (e.g., check stop tabs 136), which stops the movement of the check while the picker arm continues to travel downstream. As a result, the check can be positioned in a frame (e.g., frame 106), and a picture of the check can be taken without the picker fingers. In which case, in such an arrangement, larger picker fingers can be used without obstructing the check images.

After the check is positioned in the frame without the picker fingers, the picker arm can stop traveling downstream. In one arrangement, the spring pivot 188 is configured to transmit a signal to a CPU (e.g., CPU 127) after interacting with the guide pin 166, which causes a picker motor (e.g., picker motor 130) driving the picker arm to stop. In another arrangement, the check stop tabs transmits a signal to the CPU upon sensing pressure applied by the bottom edge of the check during the positioning stage, which in turn causes the picker motor to stop. After the picker arm is stopped, a picture of the check can be taken (e.g., via a mobile device 108).

After a picture of the check is taken, the picker arm can move in an upstream direction. In one arrangement, a mobile device that took the picture transmits a signal to the CPU confirming that the picture was taken, which causes the picker motor to reverse direction and move the picker arm upstream. The guide pin 166, now traveling in an upstream direction, comes into contact with the curved downstream side of spring pivot 188. Due to the shape and orientation of guide pivot 188 in the upstream direction, the guide pin 166 translates laterally along the downstream side of guide pivot 188 while continuing to travel upstream, ultimately moving into the downstream opening of bypass track segment 190. The lateral movement of the guide pin 166 causes a guide shaft (e.g., guide shaft 160) and corresponding picker fingers on the picker arm to transition into a disengaged configuration as the picker arm moves upstream into the bypass track segment 190. While the guide pin 166 is moving upstream through the bypass track segment 190, the picker fingers approach the check while in a disengaged configuration.

As the guide pin 166 travels through the upstream end of the bypass track segment 190, the guide pin 166 travels laterally back towards the engaged track segment 182. In turn, the guide shaft and associated picker fingers return to an engaged configuration and re-engages the check in the frame as the guide pin 166 exits into engaged track segment 182 from an upstream opening in the bypass track segment 190. In one arrangement, the check stop tabs detect the re-engagement of the check (e.g., by sensing the picker fingers lifting the check off the check stop tabs as the picker arm continues to move upstream) and transmits a signal to the CPU, thereby causing the picker motor to again reverse direction so that the picker arm and check once again travel downstream. This time, the picker arm can pass the bypass assembly, continue moving downstream, and drop off the check into an exit hopper.

Figure 5A:
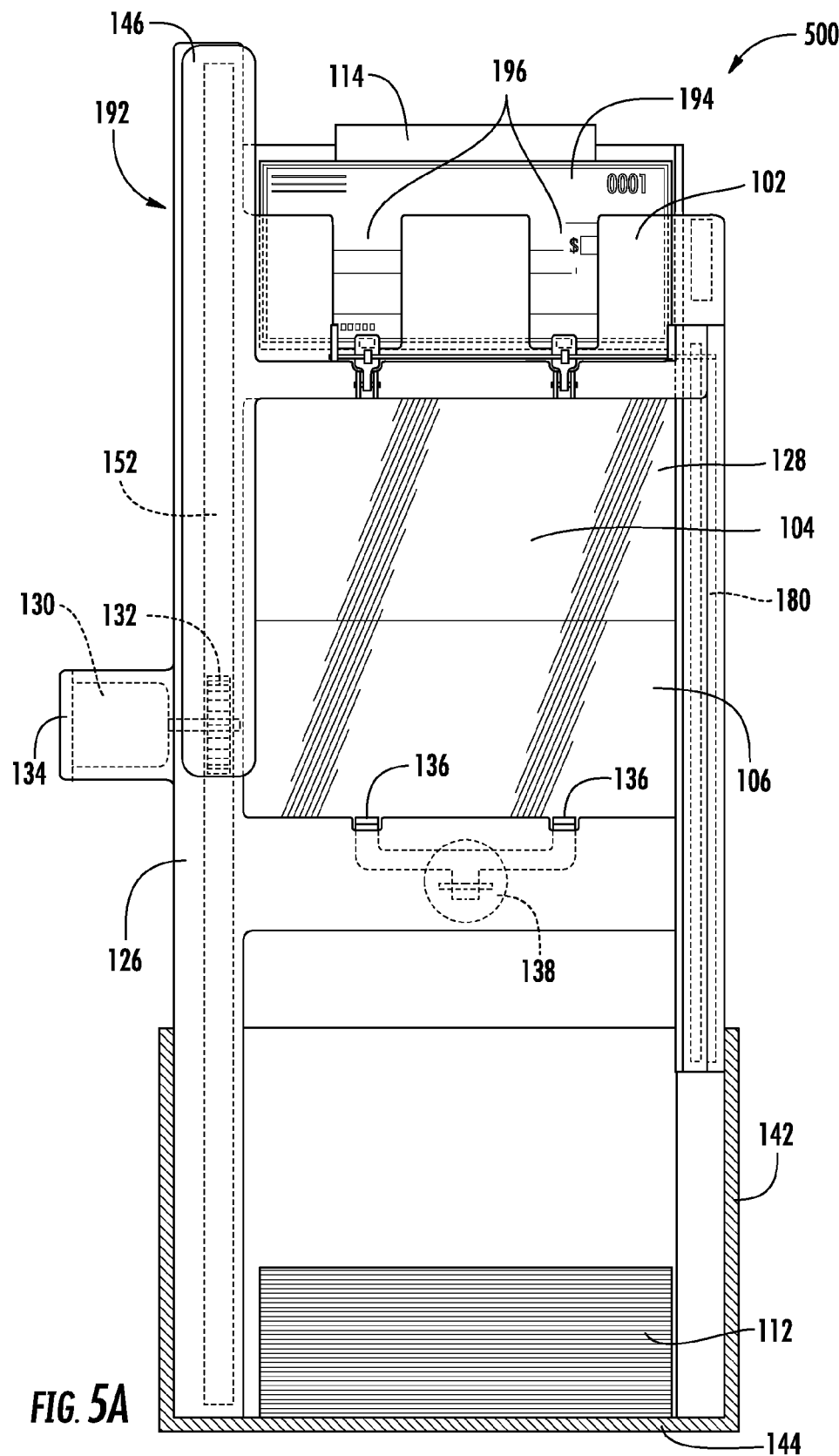
FIG. 5A is an illustrative diagram of a frontal view of a computer-implemented customer check deposit preparation and request generating system in a first configuration, according to an example embodiment.

Referring now to FIG. 5A, a front view 500 of the check deposit request preparation device 201 in a first configuration 192 is shown according to an example embodiment. In the first configuration 192, the picker motor 130 has caused the picker gear 132 to draw the picker arm 146 up to the highest position on the stand 126 via the gear track 152. At the same time, the guide pin 166 disposed at the tip of the guide shaft 160 transitions from the retracted track segment 184 (in the guide track 180) into the engaged track segment 182 (as discussed with respect to FIG. 4). As such, the guide shaft 160 and associated picker fingers 154 transition into an engaged position 174 (as discussed with respect to FIG. 3C) once the picker arm 146 reaches the highest position on the stand 126. Openings on the front wall of the hopper 102, or hopper gaps 196, allow a pad 168 on each of the picker fingers 154 to contact the first check 194 in the hopper 102 as the picker fingers 154 transition into an engaged position 174.

Figure 5B:
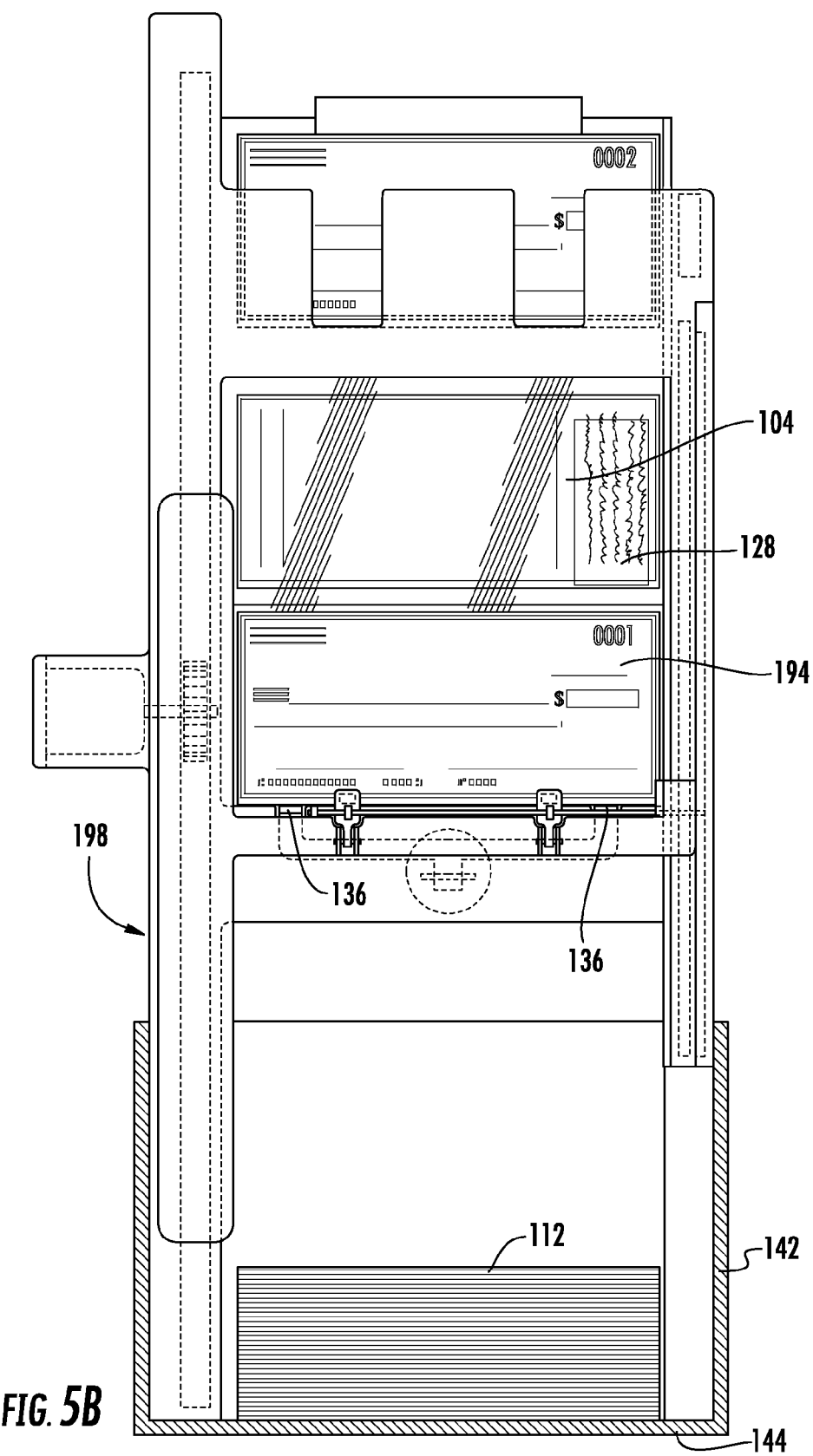
FIG. 5B is an illustrative diagram of a frontal view of a computer-implemented customer check deposit preparation and request generating system in a second configuration, according to an example embodiment.

Referring now to FIG. 5B, a front view of the check deposit request preparation device 201 in a second configuration 198 is shown according to an example embodiment. In the second configuration 198, the picker motor 130 has caused the picker gear 132 to draw the picker arm 146 down from the highest position on the stand 126 to the check stop tabs 136 via the gear track 152. The picker fingers 154 remained in the engaged position 174 throughout this process, and as such, the contact of each pad 168 on the check 194 allowed the movement of the picker arm 146 to pull the check 194 out of the hopper 102 through the feed slot 121, down the front of the portion of the frame 106 that includes the window 128, and finally into the lowest portion of the frame 106, stopping at the check stop tabs 136. Once the check 194 reached the check stop tabs 136, the check stop mechanism 135 signaled the CPU 127 that the check 194 has been properly positioned in the frame 106. At this point, the CPU 127 caused the picker motor 130 to stop, thereby halting the movement of the picker arm 146 and the check 194.

In second configuration 198, both sides of the check 194 can be seen. A first side of the check 194 is visible from the check 194 itself as positioned in the frame 106, and a second side of the check 194 can be seen via the mirror 104 disposed above the check 194 as well. As can be appreciated from FIG. 5B, the picker fingers 154 are sufficiently short to prevent the obstruction of any important portions of the check 194 while the check 194 is in the frame 106. In other embodiments, an alternative guide track can be used (e.g., as discussed with respect to FIG. 4B) to allow for the use of larger picker fingers 154.

While the picker arm 146 is in the second configuration 198, the built-in camera 123 in a mobile device 108 can capture the images of the front and the back of the check 194, allowing the mobile device 108 to subsequently process a check deposit request. In one arrangement, the camera 123 takes a first picture of a first side of the check 194 by focusing on and capturing an image of the check 194 itself. The camera 123 subsequently takes a second picture of a second side of the check 194 by focusing on and capturing an image of the mirror 104 containing a reflection of the second side of the check 194. Further, in one such arrangement, the financial institution mobile software application can be configured to crop out portions of the captured images that do not include the actual check 194 or the actual reflection of the check 194. Such a configuration allows for the processing of checks of various sizes, as images of larger commercial checks can be accommodated (i.e., as the camera's field of view is sufficiently large), while images of smaller checks can still be used (i.e., by cropping out the non-essential portions of the resulting images).

In another arrangement, the camera 123 takes a single picture that includes both the check 194 itself and the reflection of the check 194 in the mirror 104 (e.g., after focusing on the check 194 itself, or the mirror 104, or some point near the check 194 or the mirror 104). In such an arrangement, a financial institution mobile or server application can subsequently sharpen any portions of the resulting image that may be out of focus as a result of only capturing a single image. It is also possible for the financial institution mobile or server application to be configured to automatically crop any non-check portions of the resulting image, such that the camera 123 can use a large field of view to accommodate checks of varying sizes. The financial institution mobile or server application may also be configured to split a single image containing both sides of a check into two separate image files (e.g., one file for the front image and another file for the back image). In arrangements where image processing occurs at the financial institution computing system (e.g., where the mobile application sends one or more unprocessed check images to the financial institution computing system), the financial institution computing system may be configured to transmit a notice to the capture circuit at the mobile device 108 after receiving a check image. The notice may inform the capture circuit whether, after processing the check image, the check image is sufficient to complete a corresponding deposit (e.g., whether the image is overly blurry, missing essential pieces of information, or if the check in the image is folded or excessively damaged, and so on).

After the camera 123 captures image data of the check 194, the mobile device 108 transmits a signal to the CPU 127 indicating that the image capture process is complete. The CPU 127 then causes the check deposit request preparation device 201 to transition from the second configuration 198 to a third configuration 199.

Figure 5C:
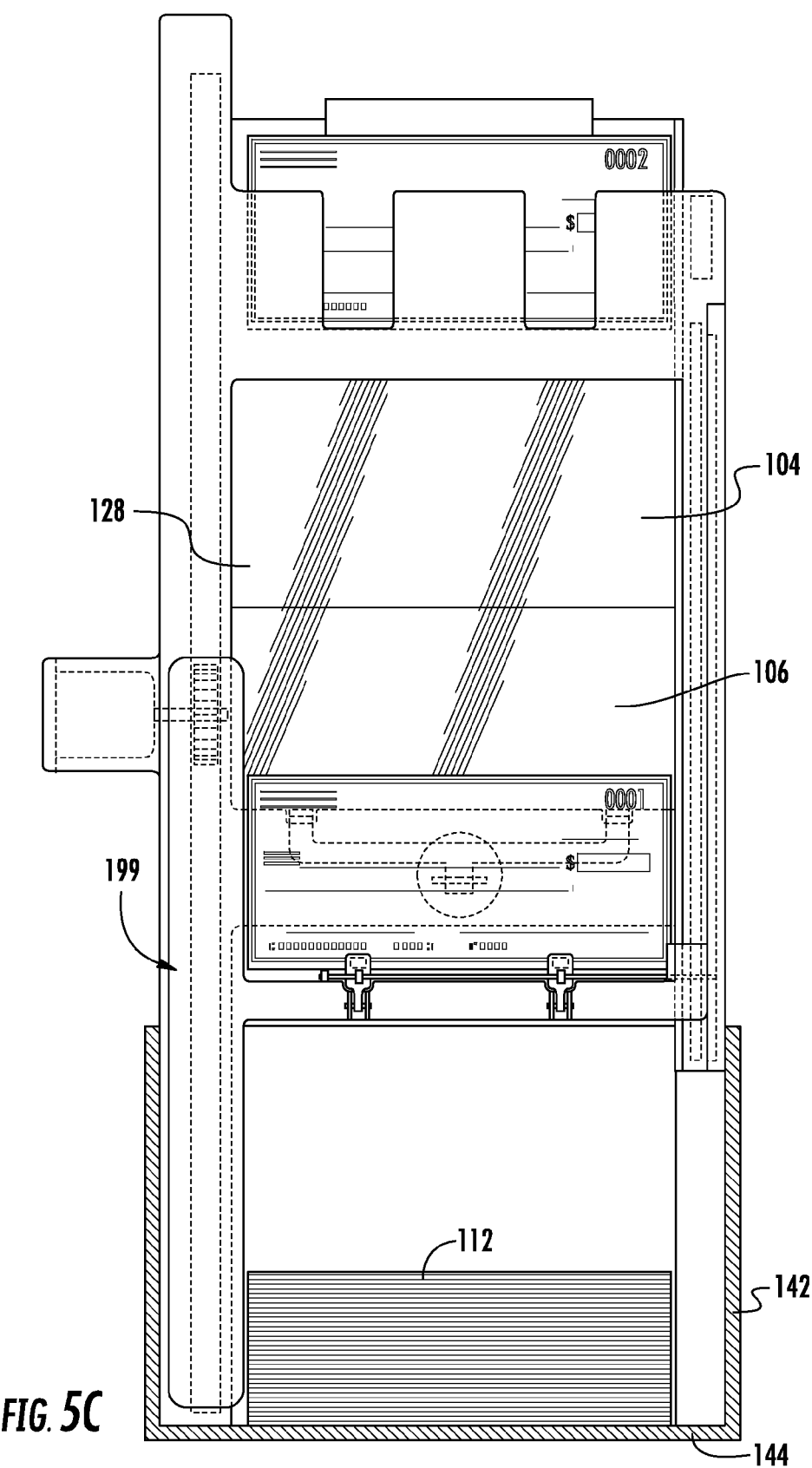
FIG. 5C is an illustrative diagram of a frontal view of a computer-implemented customer check deposit preparation and request generating system in a third configuration, according to an example embodiment.

Referring now to FIG. 5C, a front view of the check deposit request preparation device 201 in a third configuration 199 is shown according to an example embodiment. In the third configuration 199, the check stop solenoid 138 retracted the check stop tabs 136, allowing the picker motor 130 to cause the picker gear 132 to draw the picker arm 146 down from its position in the second configuration 198 to the lowest possible position on the stand 126 via the gear track 152. At the same time, the guide pin 166 disposed at the tip of the guide shaft 160 transitions from the engaged track segment 182 (in the guide track 180) into the retracted track segment 184 (as discussed with respect to FIG. 4A). As such, the guide shaft 160 and associated picker fingers 154 transition into a retracted position 176 (as discussed with respect to FIG. 3C) once the picker arm 146 reaches the lowest position on the stand 126. In some arrangements, the picker fingers 154 move into the retracted position 176 after drawing the check 194 past the frame 106 and pushing the check 194 into the exit hopper 142. With the picker fingers 154 in the refracted position 176, each pad 168 on the picker fingers 154 lose contact with the check 194, at which point the check 194 can fall into the exit hopper 142. In some arrangements, a sensor may detect that the picker arm 146 is at the third configuration 199, and cause the picker motor 130 to reverse rotation, returning the picker arm 146 to the first configuration 192 to repeat the process.

Figure 6:
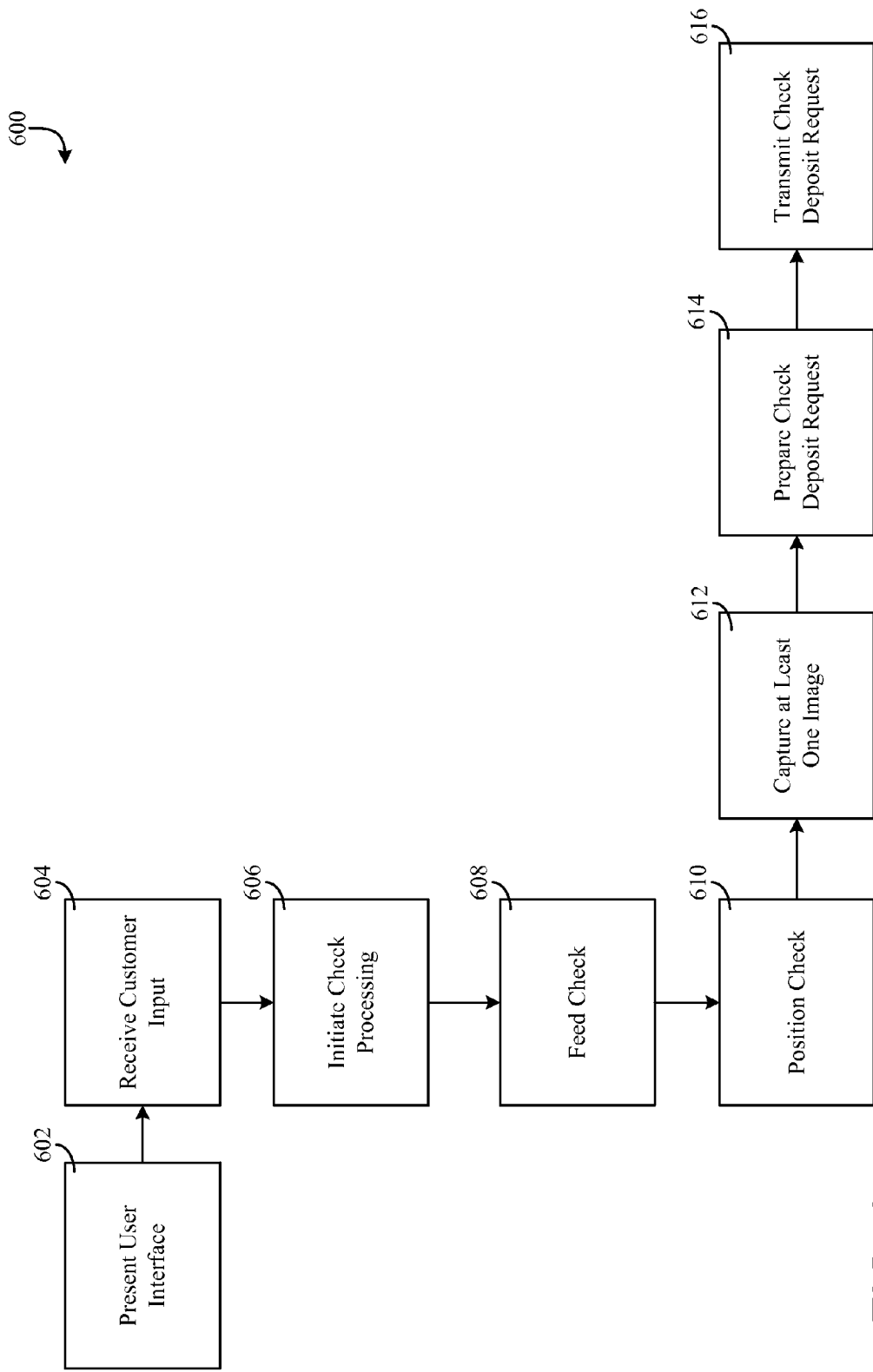
FIG. 6 is a flow diagram of a computer-implemented method of generating customer check deposit requests according to an example embodiment.

Referring now to FIG. 6, a flow diagram of a method 600 of preparing customer check deposit requests is shown according to an example embodiment. The method 600 is performed by a computer-implemented check deposit request preparation system (e.g., system 100), which provides a check deposit request generating system that allows customers to use mobile devices (e.g., mobile devices 108) to generate check deposit requests for multiple checks with minimal physical involvement. As discussed above with respect to system 100 and in further detail below with respect to method 600, the combination of a mobile device with a built-in camera (e.g., camera 123), a positioning frame (e.g., frame 106), and a mirror (e.g., mirror 104) allows a financial institution's customers to quickly and efficiently prepare a plurality of check deposit requests.

In method 600, a user interface is presented by a mobile device (602). The user interface results from launching a mobile application provided by a financial institution to its customers. Mobile applications are software programs intended to be operated on mobile devices such as smartphones, tablets, and PDAs (e.g., mobile device 108). The mobile application may be provided in the form of an "app", and can be distributed to customers through third party vendors such as the Apple App Store™ or Google Play™. Alternatively, the mobile application may be provided as a "mobile" version of the financial institution's website accessed through web browsers of the customers' mobile devices. The mobile application provides an interface for the financial institution and a customer to exchange information over a data network using the customer's mobile device. Among various features, the user interface arising from the mobile application allows customers to prepare and send check deposit requests to the financial institution.

At 604, a customer input is received. The customer input is received by the mobile device through the mobile device's built-in interaction hardware (e.g., touchscreen controls or analog button/keyboard controls). The customer input itself can include, for example, any combination of a customer's login information, an activation of the check deposit preparation process, a confirmation that the mobile device has a substantially unobstructed view of a check frame and a corresponding mirror, and the like. Common among these customer inputs are indications of the customer's intent to begin or continue a check processing sequence.

At 606, a check processing sequence is initiated. The check processing sequence is initiated by a customer's mobile device. The mobile device transmits an initiation signal to a CPU associated with a check deposit request preparation device (e.g., CPU 127 of check deposit request preparation device 201, via wireless communication such as Bluetooth™ or NFC or via wired communication such as USB). Subsequently, various actions according to various arrangements can take place in order to initiate the check processing sequence. In some arrangements, upon receiving the initiation signal from the mobile device, the CPU will run a series of checks to determine whether all of the aspects of the check deposit request preparation device are properly set up (e.g., receiving inputs from sensors associated with a check hopper to determine whether any checks are disposed in the hopper and if so, whether they are properly oriented within the hopper, or receiving inputs from sensors associated with check stop tabs to determine whether anything is obstructing the frame, or receiving inputs from the mobile device to determine whether a clear view of the frame and mirror is presented to the camera, or other such similar actions).

At 608, a check is fed. A check is fed by a check feeding device (e.g., the picker mechanism 129, as discussed above) to extract a check from a check hopper (e.g., hopper 102), and cause it to travel to a frame (e.g., frame 106).

At 610, the check is positioned. The check is positioned by a frame (e.g., frame 106) such that a first side of the check is substantially visible to a built-in camera in the mobile device. The check is also positioned such that a second side of the check is substantially visible to a mirror, which in turn is configured to project a reflection of the second side of a check disposed in the frame to the camera.

At 612, at least one image is captured. The at least one image is captured by the built-in camera in the mobile device. The camera captures at least one image that includes the first side and the reflection of the second side of the check. In some arrangements, two images are collected: an image where the first side of the check is in focus; and a second image where the reflection of the second side check is in focus. In these arrangements, the mobile application or a corresponding application at a financial institution computing system crops out those portions of the captured images that include the first or second side of the check that are out of focus, and retains the resulting clear images. In other arrangements, a single image that includes both the first side of the check and the second side of the check is captured, and the mobile application or the corresponding application at the financial institution computing system sharpens whichever side of the check that may be out of focus in the single image captured.

At 614, a check deposit request is prepared. A check deposit request is an electronic message and authorization from a customer to the customer's financial institution, containing information sufficient to cause the financial institution to draw funds from the paying party named on a given check and to deposit those funds into the corresponding customer's account at the financial institution. The check deposit request may be prepared by the mobile application in the mobile device. The check deposit request may include information relating to the customer (e.g., name, account number, date of deposit, and the like), the paying entity, and the amount to be deposited. In some arrangements, the mobile application may perform additional processing functions, such as performing one or more quality checks (e.g., making sure the check images are generally straight to ensure that the checks themselves were not misaligned, folded, or damaged), performing an optical character recognition to generate digital information corresponding to written or textual information on the checks, and so on.

At 616, the check deposit request is transmitted. The check deposit request prepared at 614 is transmitted by the mobile device over a data network (e.g., wireless networks such as cellular networks, Bluetooth, WiFi, Zigbee, etc., and/or wired networks such as Ethernet, DSL, cable, fiber-based, or a combination thereof) and directed to the customer's financial institution computing system. In some arrangements, a computing system at the financial institution is configured to receive the check deposit request and perform back end data processing, such as any of the image processing functions discussed above (e.g., quality checks, OCR, image cropping, image sharpening, and so on). In some such arrangements, after completing back end data processing, the computing system may be configured to notify the mobile device as to whether the check deposit request contains a check image sufficient to complete a corresponding deposit.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A check processing system for preparing customer check deposit requests, the system comprising:
    a check frame configured to position a check between a holder and a mirror wherein a first side of the check faces the holder, and a second side of the check faces the mirror;
    the mirror, disposed at a position and an angle behind the check frame such that a reflection of the second side of the check is projected towards the holder;
    the holder, disposed at a position and an angle in front of the check frame and the mirror, such that a first side of a check and a second side of the check are simultaneously viewable from the holder, and wherein the holder is configured to hold a mobile device.

2. The system of claim 1, wherein the mirror is curved.

3. The system of claim 1, wherein each of the check frame, the mirror, and the holder are associated with at least one pivot point, wherein the at least one pivot point allows the system to retrievably collapse into a compact formation.

4. The system of claim 1, further comprising:
    a check hopper configured to accommodate a plurality of checks; and
    a picker mechanism configured to transfer a single check from the hopper to the check frame.

5. The system of claim 1, further comprising:
    a capture circuit provided by a financial institution to the mobile device, the capture circuit being configured to:
        cause the mobile device to capture at least one image, and
        transmit the at least one image to the financial institution computing system.

6. The system of claim 5, further comprising:
    a processor in communication with one or more aspects of the check processing system, the one or more aspects being selected from a group consisting of the check frame, a check hopper, and a feeder device, wherein the processor is configured to send and receive signals resulting from the capture circuit; and
    the capture circuit, further configured to cause signals to be exchanged with the processor.

7. The system of claim 6, further comprising:
    a check hopper configured to accommodate a plurality of checks;
    a picker mechanism configured to select a check from the check hopper, transfer the check to the check frame, and discard the check, wherein the movement of the picker mechanism is driven by a picker motor;
    a guide track configured to guide the movement of the picker mechanism, the guide track comprising an engaged track segment wherein the picker mechanism is engaged to the check and a retracted track segment wherein the picker mechanism is disengaged from the check, wherein the engaged track segment and the retracted track segment together form a continuous loop, wherein the engaged track segment comprises a spring pivot and a bypass track segment wherein the picker mechanism is disengaged from the check, wherein the picker motor causes the picker mechanism to select the check from the hopper by transitioning the picker mechanism from the retracted track segment to the engaged track segment at a first end of the guide track, wherein the picker motor causes the picker mechanism to transfer the check to the check frame by translating the picker mechanism downstream through the engaged track segment, wherein the picker motor causes the picker mechanism to disengage from the check during an image capture performed by the capture circuit by causing the picker mechanism to translate upstream through the engaged track segment, contact and translate along a surface of the spring pivot and into the bypass track segment, wherein the picker motor causes the picker mechanism to reengage the check by causing the picker mechanism to translate upstream through the bypass track segment and back into the engaged track segment, wherein the picker motor causes the picker mechanism to discard the check by causing the picker mechanism to translate downstream through the engaged track segment and transition into the retracted track segment at a second end of the guide track, and wherein the picker motor causes the picker mechanism to engage another check by translating the picker mechanism downstream through the retracted track segment and back through the first end of the guide track.

8. The system of claim 6, further comprising a wireless module configured to allow the processor to wirelessly exchange signals with the capture circuit.

9. The system of claim 6, further comprising a wired data connection, wherein the wired data connection is configured to allow the processor to exchange signals with the capture circuit.

10. The system of claim 5, wherein the at least one image transmitted by the capture circuit is unprocessed; and wherein the capture circuit is further configured to receive a confirmation from the financial institution computing system that the at least one image is sufficient to complete at least one check deposit.

11. The system of claim 5, wherein the capture circuit is further configured to crop the portions of the at least one image captured that does not include a first side or a second side of a check.

12. The system of claim 5, wherein the capture circuit is further configured to:

cause the mobile device to capture at least two images with different focal points; and create a composite of the at least two images that includes an in-focus first side of a check and an in-focus second side of a check.

13. The system of claim 5, wherein the capture circuit is further configured to:

cause the mobile device to capture one image that includes a first side of a check and a second side of the check; and sharpen at least one side of the check within the one image captured.

14. A computer implemented method of generating customer check deposit requests, the method comprising:

positioning, by a check frame, a check between a holder configured to hold a mobile device with a capture circuit and a mirror such that a first side of the check and a second side of the check are simultaneously visible to the mobile device;

capturing, by the capture circuit, at least one image of the first side and second side of the check;

preparing, by the capture circuit, a customer check deposit request; and transmitting, by the capture circuit, the customer check deposit request to a financial institution computing system.

15. The method of claim 14, further comprising feeding, by a feeder device, a check from a hopper to the check frame.

16. The method of claim 14, further comprising exchanging, by the capture circuit, signals between a processor in communication with one or more aspects of a check processing system, the one or more aspects selected from a group consisting of the check frame, a check hopper, and a feeder device.

17. The method of claim 14, wherein the at least one image transmitted is unprocessed and further comprising receiving, by the capture circuit, a confirmation from the financial institution computing system that the at least one image is sufficient to complete at least one check deposit.

18. The method of claim 14, further comprising cropping, by the capture circuit, the portions of the at least one image captured that does not include a first side or a second side of a check.

19. The method of claim 14, further comprising:

causing, by the capture circuit, the mobile device to capture at least two images with different focal points; and creating, by the capture circuit, a composite of the at least two images that includes an in-focus first side of a check and an in-focus second side of a check.

20. The method of claim 14, further comprising:

causing, by the capture circuit, the mobile device to capture one image that includes a first side of a check and a second side of the check; and sharpening, by the capture circuit, at least one side of the check within the one image captured.

* * * * *